Dec. 24, 1935.  L. O. STAMMBERGER  2,025,134
PROGRAM CONTROL OF NITRIDING
Filed March 15, 1932  2 Sheets—Sheet 1

Inventor
Lorenz O. Stammberger
Cornelius D. Ehret
By his Attorney.

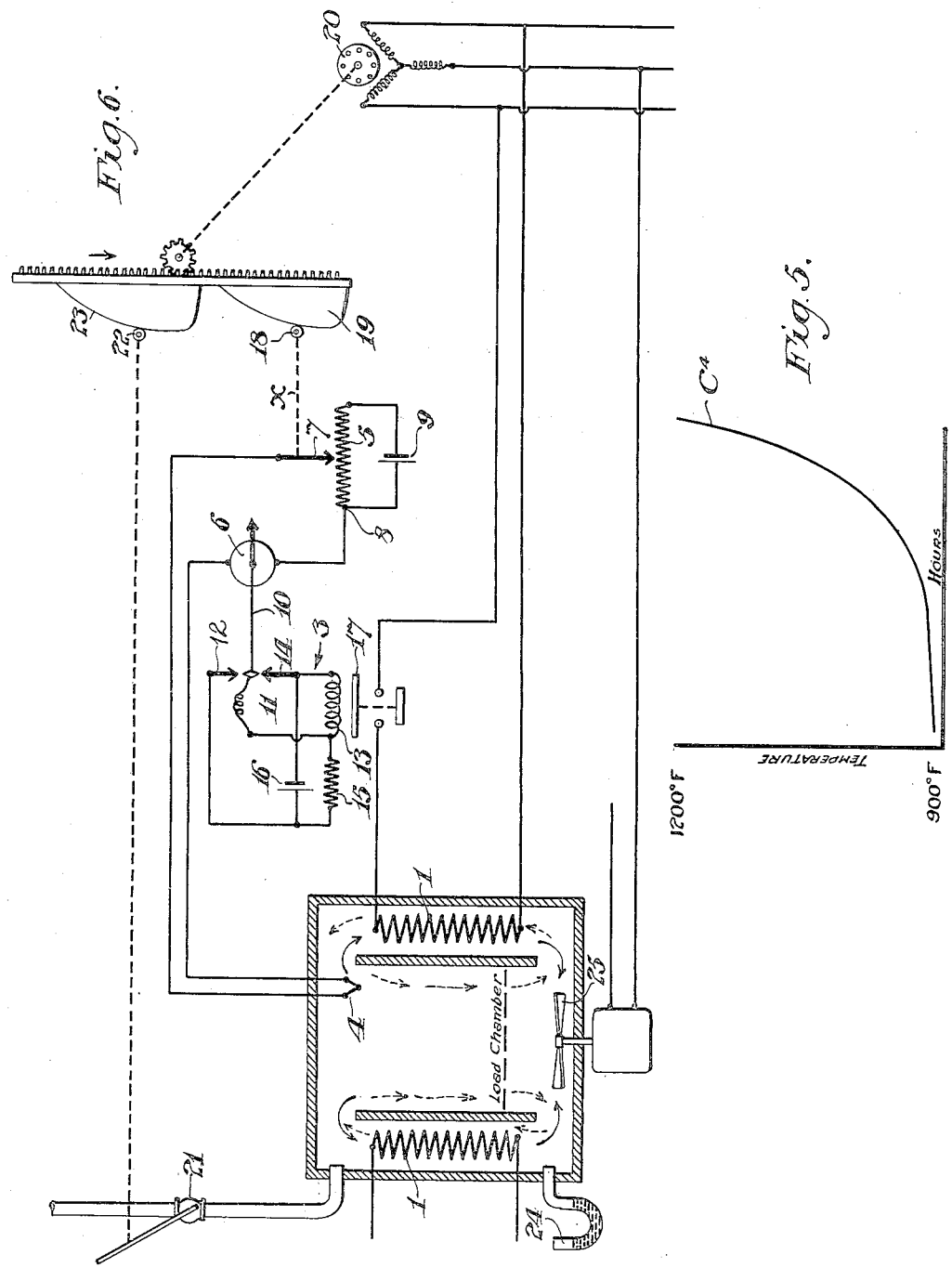

Patented Dec. 24, 1935

2,025,134

UNITED STATES PATENT OFFICE 2,025,134

PROGRAM CONTROL OF NITRIDING

Lorenz O. Stammberger, Utica, N. Y., assignor to Leeds & Northrup Company, Philadelphia, Pa., a corporation of Pennsylvania Application March 15, 1932, Serial No. 599,052

9 Claims. (Cl. 148—16)

My invention relates to the art of nitriding and particularly to control of the surface hardness and depth of the case resulting from nitriding.

In accordance with my invention, the temperature of the articles being nitrided or to which they are subjected during nitriding is gradually increased from a temperature within the nitriding range to a substantially higher temperature within the range to obtain substantial increase in the penetration, without appreciable sacrifice of surface hardness and without abrupt change or changes in the hardness-depth curve.

Further, the work may be held at one or more low temperatures within the nitriding range and thereafter its temperature is progressively increased to highest desired temperature within the range.

Preferably, the nitriding gas is forcibly stirred or agitated to ensure that the temperature is the same for all parts of the load at any given time, and that the temperature of all parts of the load is changing at the same rate.

Also in accordance with my invention, the rate of supply of nitriding gas, as ammonia, is increased, with increase of temperature, to reduce the time for effecting the desired penetration still further and to reduce any loss of surface hardness by prolonged exposure to the higher temperatures.

My invention further resides in the methods and system hereinafter described and claimed.

For an understanding of my invention reference is to be had to the accompanying drawings in which:

Figs. 1 to 5 are explanatory curves referred to in the description.

Fig. 6 is an automatic system for effecting program control of the nitriding process.

Heretofore it has been the practice in nitriding to maintain the temperature constant at a selected value within the range of nitriding temperatures, i. e., at some temperature between about 875° F. and 1200° F. Nitriding at the lower temperatures of the range gives a very hard case but little penetration so that this method is unsuited for valves, valve seats, etc., which are subjected to impact or more or less localized stresses. Due to the steepness of the case gradient, the case cracks or spalls when subjected to working conditions. Nitriding at the higher temperatures affords greater penetration but the resulting case is too soft for most practical uses.

Figure 1:
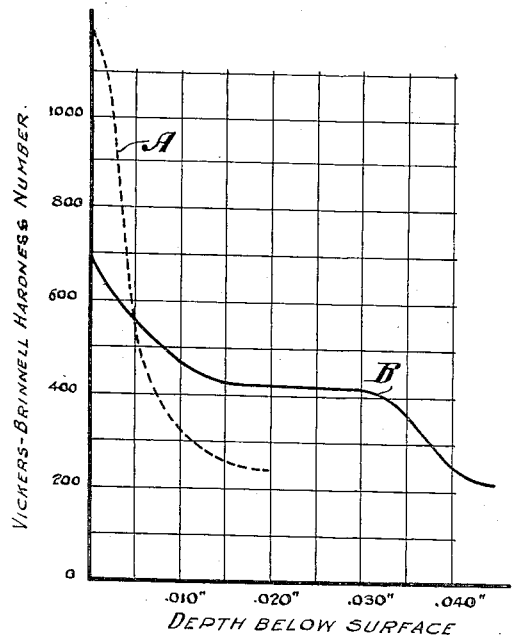

These facts are graphically illustrated by Fig. 1 in which the curve A represents the hardness-depth curve of a sample held at a temperature of about 925° F. for a certain time, about 24 hours, and curve B represents the hardness-depth curve of a sample held at a materially higher temperature, about 1180° F., for the same length of time.

For any given temperature within the range the penetration may be increased by increasing the duration of the nitriding reaction but the increase of penetration is not commensurate with the increased time, i. e., the rate of penetration falls off rapidly after fifteen to twenty hours. Moreover there is substantial loss of surface hardness if the time of treatment is protracted.

It has been proposed to increase the penetration by heating the work for a certain number of hours at a low nitriding temperature and then to heat the work at a higher temperature for a like or different number of hours. The case resulting from this so-called "duplex" heating, is of inferior surface hardess, and the hardness gradient suffers abrupt changes. Pieces so treated are of inferior wear-resisting ability and are subject to cracking or spalling of the case at the zones or planes defined by the abrupt change of hardness gradient.

In accordance with the present invention, the temperature is progressively increased during nitriding; after the load has reached 875° F., for example, the supply of heat is controlled to raise the temperature to a materially higher temperature in a predetermined time, for example to 1140° F. in 24 hours.

Figure 2:
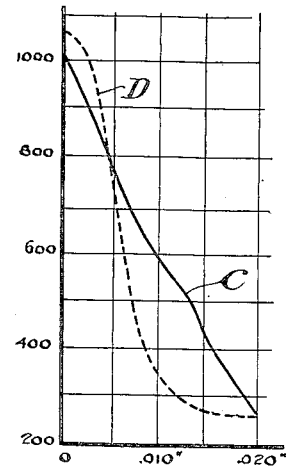

As graphically illustrated in Fig. 2, the penetration of case, as shown by curve C, is materially increased and the surface hardness is not materially less than that of curve D of a sample held at 950° for the same length of time.

Moreover the hardness-depth characteristic as exemplified by curve C, is smoothly continuous and devoid of abrupt changes in slope; in fact, it is substantially a straight line, the hardness varying with depth substantially as a linear function. Furthermore, the characteristic C is substantially linear throughout and is therefore distinguished from other characteristics including the curve D which suffers pronounced changes in curvature. The characteristic D in different portions shows marked and rapid changes in its slope which are even more pronounced for case obtained by so-called "duplex" heating cycles; while the characteristic C is, practically throughout, linear, with no abrupt changes in slope and in fact with no changes in slope except those which are at the most insubstantial and unimportant. The characteristic C represents also, aside from its linear aspect, that important feature of my invention which concerns procurement of a non-spalling case of both high surface hardness and deep penetration, without abrupt change in, and preferably without reversal of, slope of the hardness-depth characteristic.

Figure 3:
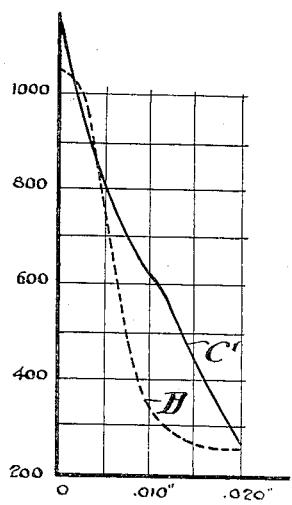

To take advantage of the formation of an extremely hard case on the surface of the work, the temperature may be held at a low magnitude for a length of time and then progressively increased to the highest desired temperature. The effect, as apparent by comparison of curve C1, Fig. 3, and curve C, Fig. 2, is a substantial increase in surface hardness with about the same penetration. The total time and final temperatures are the same in both instances for purposes of comparison but in obtaining the curve C1 the temperature was held at 900° F. for six hours, and raised from 900 to 1140° F. in eighteen hours.

It is also characteristic of the curve C1, that it is smoothly continuous, and substantially linear throughout. The attainment of extremely high surface hardness and great penetration is effected without introduction of abrupt changes in hardness gradient. The case retains all the advantages represented by curve C of Fig. 2 and in addition attains substantially enhanced surface hardness.

Figure 4:
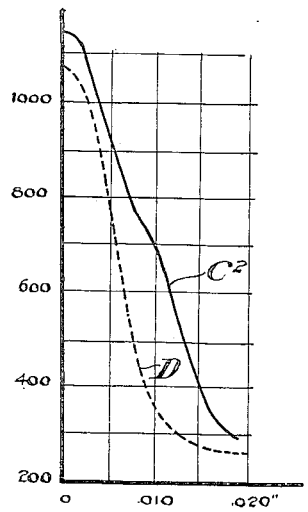

An extremely hard surface with a still more gradual hardness gradient may be obtained by holding the temperature at a low magnitude, say 900° F., for some time, as three hours, then at a somewhat higher value, for example, 950° F., for a time, as three hours, and then with a progressive change in temperature to the desired maximum for example 1130° F. Curve C2 of Fig. 4 represents the resulting case, the total time being twenty-four hours, and by comparison with curve C1 of Fig. 3, the improvement in the case gradient particularly near the surface is apparent. Both in surface hardness and case gradient, the sample so treated is much superior to the comparison sample having the characteristic curve D.

The characteristic C2 is also smoothly continuous and devoid of any abrupt changes in slope, or otherwise expressed, this variation of my method affords extremely high surface hardness, still greater penetration, and a case gradient which is devoid of abrupt changes. The characteristic is substantially linear, except immediately adjacent the surface where the change in hardness is even more gradual. This method therefore affords greater penetration of both the hard nitrides at the surface, and of the softer nitrides at distances further and further from the surface.

The method affords higher surface hardness than that represented by curve D; in addition it results in improved penetration, and the case gradient is more gradual. The method affords results far superior to the so-called "duplex" methods in surface hardness, penetration, and smoothness of case gradient.

High surface hardness and a slowly and uniformly decreasing hardness with depth may be obtained by a continuous change in temperature from the lowest to the highest temperatures of the treatment, the control being such that the rate of increase of temperature is small at the lower nitriding temperatures, with increasing rate of increase of temperature at the higher nitriding temperatures. Briefly, the incremental increase of temperature per unit of time becomes greater and greater as the treatment progresses. Fig. 5 illustrates a representative time-temperature curve of this character. This affords ample time for formation of the hard nitrides at the lower temperatures and procures inward diffusion of the softer nitrides at such rapid rate that the time for obtaining the desired penetration at the higher temperature is so short that the surface hardness is not appreciably affected.

As the permeability of the metals, steel for example, to nitrogen increases rapidly with increased temperature, the efficiency of any of the aforesaid programs may be increased by increasing the rate of supply of gas as the temperature is increased. For instance, concurrently with increase in the rate of increase of temperature the rate of supply of ammonia may be increased more and more rapidly.

It will be understood that the aforesaid specific time-temperature programs are illustrative of my invention, but the invention is not limited thereto. The initial and final temperatures, the duration of treatment, the rate of increase of temperature, etc., are selected in view of the foregoing to obtain the characteristics desired for the particular use of the objects to be nitrided. By program control, the surface hardness, the penetration, and gradation of the case can be predetermined.

The control of temperature may be performed manually, that is, an operator may vary the supply of heat input to the furnace, by a switch, fuel valve, or the like depending upon the nature or source of heat, in accordance with a predetermined program by observing the indications of any suitable temperature responsive device and a clock or equivalent. The rate of supply of ammonia may be controlled manually, the operator changing the setting of the inlet valve to obtain a desired rate of flow, as indicated by any suitable instrument, as a flowmeter, for the existing temperature.

However, it is desirable that the control be effected automatically as reproducible results are more readily obtained thereby, and the variables are regulated more closely than is usually possible by even a conscientious operator. Any suitable system for effecting automatic program control may be used; for example, Bonn Patent 1,795,753 discloses a satisfactory arrangement for procurement of desired temperature-time programs.

A typical system is shown in Fig. 6. The heaters, 1, 1, or equivalent, of the nitriding furnace which may be of the type disclosed in copending Harsch application Serial No. 336,065, filed January 30, 1929, now Patent #1,999,757, April 30, 1935 or of Harsch application Serial No. 597,877, filed March 10, 1932, now Patent #1,949,716, March 6, 1934, are controlled by relay 3. A thermocouple 4 responsive to the furnace, or work temperature is connected to a potentiometer system comprising the potentiometer resistance 5, which may be provided with a temperature scale, and a deflection instrument, or galvanometer 6. In the specific arrangement shown, when the thermocouple voltage is equal to the difference of potential between the slide wire contact 7 and terminal 8 of the resistance due to current from battery 9, or equivalent, there is no flow of current through galvanometer 6, which therefore remains in its neutral position.

If the actual temperature is higher than that called for by the setting of contact 7, the movable element 10 of the galvanometer, due to unbalance of the potentiometer system, moves downwardly short-circuiting, through contacts 11, 14, the holding coil 13 of the relay 3. Relay armature 17 falls, opening the circuit of heaters 1. When the temperature falls below the temperature setting of contact 5, the potentiometer system is unbalanced in a reverse direction, whereupon galvanometer 6 deflects to short-circuit through contacts 11, 12, the resistance 15. The current from battery 16 flowing through the relay coil 13 is then sufficient to attract the armature 17 to effect closure of the heater circuits. As the temperature rises, the galvanometer arm 10 separates contacts 11, 12 but the heater circuit remains closed and the current through coil 13 though reduced by reinsertion of resistance 15 is sufficient to hold the armature 17 in its attracted position.

To effect program control, the setting of contact 7 is varied according to the desired time-temperature schedule. For example, it may be mechanically coupled, as generically indicated by dotted line $x$ to a follower 18 for cam 19 which is cut to give increased temperature settings of contact 7 as cam 19 is moved downwardly by the time device 20, for example, a synchronous motor.

As the follower 18 advances along the cam, contact 7 is shifted further and further from point 8 of the potentiometer network requiring a higher thermocouple voltage to effect balance. Accordingly, the supply of current to the heaters is controlled to effect higher and higher temperatures of thermocouple 4. The adaptation of the system to gas-fired furnaces is obvious. Any of the aforesaid programs, or any other desired program, may be effected by using a cam 19 of the proper shape.

The supply of ammonia to the furnace may be automatically controlled by mechanically coupling the operating member of the inlet valve 21 to a follower 22 for a cam 23 driven in synchronism with cam 19 which can be formed to give any desired rate of flow of ammonia for each temperature setting of contact 7 as determined by its cam 19. The U-tube 24, or equivalent, seals the furnace to atmosphere but permits escape of exhausted gas to maintain a desired super-atmospheric pressure within the furnace.

Whether the program is manually or automatically controlled, forcible circulation of the ammonia is highly desirable. Without forcible circulation, the different parts of the load may not properly follow the program for the temperatures and concentrations of nitrogen may differ widely throughout the load. For example, the objects nearest the heaters are much hotter than those nearer the center; and the objects nearest the incoming ammonia are in a richer atmosphere. As the nitride case is a function of both temperature and gas concentration, the varieties of case characteristics are innumerable when forcible circulation is not used.

With forcible circulation of the ammonia, as by fan 25, uniformity of temperature and concentration throughout the treating chamber is maintained at all times as the program progresses. Consequently, all of the objects of the load have the hardness-depth characteristic for which the program was intended, and the results may be duplicated for successive batches of work.

Reference in the appended claims to a substantially linear hardness-depth characteristic shall be construed as referring to and including broadly a substantially linear function of change in hardness with depth or substantially inverse proportionality of hardness to depth, exemplified by, but not limited to, such characteristics as C, C1 and C2, hereinbefore described; and including hardness-depth characteristics devoid of abrupt change in or reversal of slope.

What I claim is:

1. In the art of nitriding, the method of imparting to the load high surface hardness with smoothly continuous and substantially linear hardness-depth characteristic, which comprises maintaining the temperature of the load in a nitriding atmosphere substantially constant at a low magnitude of from about 875° F. to about 1000° F. for a predetermined period, and thereafter and during a substantial portion of the total nitriding period progressively increasing the temperature to a substantially higher magnitude of from about 1100° F. to about 1200° F.

2. In the art of nitriding, the method of imparting to the load high surface hardness with smoothly continuous and substantially linear hardness-depth characteristic, which comprises maintaining the work, in the presence of a nitriding atmosphere, at a temperature held constant at a low magnitude within the range of from about 875° F. to about 1000° F. for a predetermined period, thereafter maintaining the temperature constant at a higher magnitude within said temperature range for a predetermined period, and thereafter progressively increasing the temperature to a substantially higher magnitude of from about 1100° F. to about 1200° F.

3. In the art of nitriding, the method of imparting to the load high surface hardness with smoothly continuous and substantially linear hardness-depth characteristic, which comprises maintaining the work, in the presence of a nitriding atmosphere, at a temperature held constant at a low magnitude within the range of from about 875° F. to about 1000° F. for a predetermined period, thereafter maintaining the temperature constant at a higher magnitude within said temperature range for a predetermined period, and thereafter during a period greater than either of the aforesaid periods progressively increasing the temperature to a substantially higher magnitude of from about 1100° F. to about 1200° F.

4. The method of nitriding which comprises increasing the rate of change of temperature of the work in a nitriding atmosphere as the temperature is raised from a low magnitude of from about 875° F. to about 1000° F. to a higher magnitude of from about 1100° F. to about 1200° F., concurrently increasing the rate of supply of the nitriding agent while forcibly circulating it to ensure substantially simultaneous and equal changes of temperature throughout the work and of the concentration of said agent.

5. In the art of nitriding, the method which comprises subjecting the work, in the presence of a nitriding reagent, to a relatively low nitriding temperature of magnitude effecting high surface hardness of the case, and, during a substantial portion of the total nitriding period, progressively raising the temperature of the work to a relatively high nitriding temperature to effect a hardness-depth characteristic devoid of abrupt change in slope.

6. In the art of nitriding, the method which comprises applying heat to the work to effect, in the presence of a nitriding reagent and during a substantial portion of the total nitriding period, progressive increase of temperature of the work from a temperature within the range of low nitriding temperatures including 875° F. which effect a hard shallow case, to a substantially higher temperature within the range of high nitriding temperatures including 1200° F. to obtain a case of high surface hardness, great penetration, and a hardness-depth characteristic devoid of abrupt change of slope.

7. In the art of nitriding, the method which comprises applying heat to the work in the presence of a nitriding reagent to maintain the work temperature substantially constant for a predetermined period at a temperature within the range of low nitriding temperatures including 875° F. for which a hard shallow case is formed, and thereafter and during a substantial portion of the total nitriding period of time progressively increasing the work temperature to a substantially higher temperature within the range of high nitriding temperatures including 1200° F. to obtain a case of high surface hardness, great penetration, and a hardness-depth characteristic devoid of abrupt change of slope.

8. In the art of nitriding, the method which comprises applying heat to the work to effect in the presence of a nitriding reagent and during a substantial portion of the total nitriding period, progressive increase of temperature of the work from a temperature within the range of low nitriding temperatures including 875° F. which effect a hard shallow case, to a substantially higher temperature within the range of high nitriding temperatures including 1200° F. to obtain a case of high surface hardness, great penetration, and a hardness-depth characteristic devoid of abrupt change of slope, and increasing the rate of change of temperature with increase of temperature.

9. In the art of nitriding, the method which comprises applying heat to the work to effect in the presence of a nitriding reagent and during a substantial portion of the total nitriding period, progressive increase of temperature of the work from a temperature within the range of low nitriding temperatures including 875° F. which effect a hard shallow case, to a substantially higher temperature within the range of high nitriding temperatures including 1200° F. to obtain a case of high surface hardness, great penetration, and a hardness-depth characteristic devoid of abrupt change of slope, and concurrently progressively increasing the rate of supply of nitriding agent.

LORENZ O. STAMMBERGER.